Patented June 18, 1940 Re. 21,485

UNITED STATES PATENT OFFICE 21,485

COMPOSITION OF MATTER CONTAINING A CELLULOSE DERIVATIVE

Harry M. Weber, West Englewood, N. J., assignor to Ellis-Foster Company, Montclair, N. J.

No Drawing. Original No. 1,690,515, dated November 6, 1928, Serial No. 62,293, October 13, 1925. Application for reissue September 14, 1939, Serial No. 294,950

5 Claims. (Cl. 260—16)

This invention relates to a composition of matter comprising artificial resins, and relates especially to resins of complex constitution prepared from drying and semi-drying oils and their fatty acids, an organic acid other than the fatty acids from oils, and a polyhydric alcohol, such complex resins having incorporated with them a toughening agent, such as an ester or ether of cellulose, particularly nitrocellulose, and is a continuation in part of my Reissue Patent No. 19,967 in which I have described the preparation of a complex resin from resin and non-resin acids, and a polyhydric alcohol.

In the present invention resins prepared from drying or semi-drying oils, such as linseed oil, soya bean oil or corn oil, or their fatty acids, an organic acid, such as phthalic anhydride, and glycerol, glycol, or other appropriate alcohol, toughened by means of a cellulose ester or ether, are superior in that compositions so prepared are less susceptible to outside influences, such as moisture, light, etc., particularly where such composition is to be used for the preparation of lacquers or lacquer enamels, which would be subject to exposure to the weather. Furthermore, when used for the preparation of plastic compositions, films, molded articles of the shellac type, and the like, their workability is somewhat superior to the resins previously produced.

As stated in my Patent Reissue No. 19,967 the nitrocellulose esters are not compatible with a great many substances, but the resins produced by means of the present invention as well as those mentioned in my previous patent are compatible in all proportions with these compounds producing products of great toughness.

As an example of a method of preparing the resinous compositions, the following is cited:

| | Parts |
|---|---|
| Glycerol | 94 |
| Phthalic anhydride | 160 |
| China-wood oil | 80 |

were heated in a closed vessel fitted with a short air-cooled reflux condenser and having means for mechanically agitating the reacting constituents to a temperature of 235° C. Water was evolved throughout the reaction.

The product was a dark yellow hard brittle resin containing a slight amount of free oil. The resin had a melting point of 73° C., and an acid number of 56. It was soluble in a fifty fifty butyl acetate butyl alcohol mixture and was compatible with nitrocellulose in all proportions. A film formed from butyl alcohol butyl acetate solution of nitrocellulose and the resin was extremely tough, but slightly turbid, due to the small quantity of free oil present.

Resins prepared from the fatty acids of the drying or semi-drying vegetable oils are superior to those prepared from the drying oils themselves in that they can be prepared with greater ease and with less danger of polymerization with consequent loss of the materials and a homogeneous resin is produced containing no free oil which would interfere with the production of suitable articles for all purposes when blended with a cellulose ester or ether.

As an example of a resin of this character

| | Parts |
|---|---|
| Glycerol | 94 |
| Phthalic anhydride | 160 |
| Fatty acids (obtained from soya bean oil) | 80 |

were heated up to a temperature of 265° C., and the product held at this point until a resin of suitable hardness was obtained.

The product as obtained was a dark brittle slightly tacky resin having a melting point of 71° C., and an acid number of 17. The resin was soluble in butyl acetate and butyl alcohol mixture and was readily blendable with nitrocellulose.

Films produced from a mixture of the resin and nitrocellulose were clear, transparent, tough and were resistant to weathering conditions.

Resins can also be produced from mixtures of fatty acids of vegetable oils and vegetable oils with an organic acid and an alcohol which are suitable for use for the purposes of the present invention.

For example, a resin was prepared from

| | Parts |
|---|---|
| Glycerol | 94 |
| Phthalic anhydride | 160 |
| Fatty acids from castor oil | 20 |
| Corn oil | 60 |

by heating in the vessel described in Example 1 up to a temperature of 260° C. The resin so produced was light in color, somewhat turbid, hard and brittle with indications of containing a small amount of free oil.

When dissolved in a mixture of equal parts of butyl alcohol, butyl acetate, and blended with a similar solution of nitrocellulose, it was necessary to add a small quantity of acetone in order to obtain a clear solution.

A film prepared from such solution was slightly turbid, tough and resistant to weathering conditions.

Blown oils such as blown castor oil, blown rapeseed oil and the like may also be used in the preparation of a resinous complex, and resins prepared from this material are superior in that they can be prepared at a lower temperature than those prepared from the fatty acids, or the vegetable oils, or mixtures of these, and produce a product which weathers extremely well. They have the disadvantage that they produce a comparatively dark colored resin, and therefore are not as desirable for the preparation of compositions for use in clear lacquers or light colored plastic compositions, but are confined to the preparation of pigmented lacquers, enamels, or dark colored plastic compositions where color is not of importance.

As an example

| | Parts |
|---|---|
| Glycerol | 94 |
| Phthalic anhydride | 160 |
| Heavy blown rapeseed oil | 80 |

were heated in the apparatus mentioned in Example 1 to a temperature of 235° C., and held at this point until the product had reached a sufficient degree of hardness when cold.

When cold the product was a hard extremely tough resin, dark in color, but was compatible with nitrocellulose. Films prepared from a mixture of the resin and nitrocellulose equal parts by means of a butyl acetate butyl alcohol solution were clear and transparent though somewhat dark in color.

In the foregoing examples phthalic anhydride has been cited as the organic acid used in the preparation of the resinous complex, but it is to be understood that other organic acids such as benzoic, maleic, tartaric, succinic, and the like, or mixtures of these, may also be used and be within the scope of the present invention.

Vegetable oils and fatty acids obtained from vegetable oils other than those mentioned in the example can also be used, such as soya bean oil, linseed oil, cocoanut oil, China-wood oil, and the like, or products obtained by blowing these oils, or mixtures of these.

What I claim is:

1. A liquid coating composition comprising a solution of nitrocellulose incorporated with a resinous product resulting from the reaction of phthalic anhydride and glycerol with fatty acid radicals of vegetable oil selected from the group consisting of the drying and semi-drying oils.

2. A liquid coating composition comprising a solution of nitrocellulose incorporated with a resinous product obtained from the reaction of fatty acid radicals of a drying oil with phthalic anhydride and glycerol.

3. A liquid coating composition comprising a solution of nitrocellulose incorporated with a resinous product resulting from the reaction of fatty acid radicals of a semi-drying oil with phthalic anhydride and glycerol.

4. A liquid coating composition comprising a solution of nitrocellulose incorporated with a reaction product of a fatty acid from a drying oil, phthalic anhydride and glycerol.

5. A liquid coating composition comprising a solution of nitrocellulose incorporated with a reaction product of a fatty acid from a semi-drying oil, phthalic anhydride and glycerol.

HARRY M. WEBER.